(12) United States Patent
Iwai

(10) Patent No.: US 7,084,415 B2
(45) Date of Patent: Aug. 1, 2006

(54) FINGERPRINT READING METHOD USING COMPARED MONOCHROMATIC IMAGES AND FINGERPRINT READING APPARATUS

(75) Inventor: Hajimu Iwai, Kyoto (JP)

(73) Assignee: Omron Corporation, Kyoto (JP)

( * ) Notice: Subject to any disclaimer, the term of this patent is extended or adjusted under 35 U.S.C. 154(b) by 272 days.

(21) Appl. No.: 10/197,549

(22) Filed: Jul. 18, 2002

(65) Prior Publication Data

US 2003/0025897 A1 Feb. 6, 2003

(30) Foreign Application Priority Data

Aug. 6, 2001 (JP) ............................. 2001-237349

(51) Int. Cl.
*G06K 5/00* (2006.01)

(52) U.S. Cl. ...................................... 250/556; 382/124

(58) Field of Classification Search ................ 250/556, 250/208.1, 221; 382/124–127, 115; 356/71
See application file for complete search history.

(56) References Cited

U.S. PATENT DOCUMENTS

| 5,088,817 A | * | 2/1992 | Igaki et al. .................... 356/71 |
| 5,737,439 A | * | 4/1998 | Lapsley et al. .............. 382/115 |
| 6,011,860 A | * | 1/2000 | Fujieda et al. .............. 382/126 |

FOREIGN PATENT DOCUMENTS

| JP | 2000-20684 | 1/2000 |
| JP | 2001-78990 A | 3/2001 |

OTHER PUBLICATIONS

Patent Abstracts of Japan, 03-188574, Aug. 16, 1991, Organism Identification Device.
Patent Abstracts of Japan, 02-307176, Dec. 20, 1990, Organism Identifying Device.
Patent Abstracts of Japan, 02-133892, May 23, 1990, Fingerprint Image Input Device.
Patent Abstracts of Japan, 2000-201907, Jul. 25, 2000, Fingerprint Detecting Method.

* cited by examiner

*Primary Examiner*—Thanh X. Luu
(74) *Attorney, Agent, or Firm*—Dickstein Shapiro Morin & Oshinsky LLP

(57) ABSTRACT

A red LED which emits red light and a green LED which emits green light are provided as light sources to emit detection beams onto a fingerprint collation surface. With a finger tip pressed against the fingerprint collation surface, only the red LED is enabled to emit light and reflected light from that surface at this time is input to an image pickup unit, thereby providing a first image. Likewise, only the green LED is enabled to emit light, thereby providing a second image. A difference between intensity levels of reflected light according to the undulations of the fingerprint is determined as a first differential contrast for the first image or second differential contrast for the second image. When the absolute value of a difference between the two differential contrasts is greater than a threshold value, the finger tip is determined as a genuine living finger tip.

12 Claims, 5 Drawing Sheets

FINGERPRINT READING METHOD USING COMPARED MONOCHROMATIC IMAGES AND FINGERPRINT READING APPARATUS

BACKGROUND OF THE INVENTION

1. Field of the Invention

The present invention relates to a fingerprint reading method and a fingerprint reading apparatus.

2. Description of the Related Art

Today, the authenticity of a person is often checked through fingerprint collation by using a fingerprint reading apparatus instead of using a password. An optical fingerprint reading apparatus converts the undulations of a fingerprint of a person into intensities of light, converts the intensities to an electric signal (image signal according to the fingerprint) by an image pickup unit, then compares the obtained with electric signal with the electric signal of that person that has been stored in advance to check if the person is authentic. To obtain a signal of a light intensity according to a fingerprint, a detection beam emitted from a light source is irradiated on a fingerprint collation surface against which a finger tip is pressed, and that detection beam which is reflected at the fingerprint collation surface or reflected light is input to the image pickup unit via an image forming lens or the like.

With such a fingerprint reading apparatus in use, there may be some people who attempt deceit of pressing false fingers, which have the fingerprints of other persons, against the fingerprint collation surface instead of pressing their genuine fingerprints. That is, there may be some people who try to practice deception to illegitimately pass as inauthentic persons though they are not. There are various false fingers conceivable. One example is a copied image of (the fingerprint at) the finger tip of an authentic person.

To prevent deception using such a false finger, a check is made to determine if a finger tip pressed against the fingerprint collation surface is a genuine one or determine the authenticity of the finger tip. One scheme of checking the authenticity of a finger tip is to discriminate whether an object pressed against the fingerprint collation surface is a living body or not (see, for example, Japanese Patent No. 2637253, Japanese Patent No. 2774313, Japanese Patent No. 277375 and Japanese Patent Laid-Open No. 2000-201907).

All the schemes described in those publications require that a separate special structure to detect a living body be added to an optical system which is needed for fingerprint collation. This requirement is an essential cause for the enlargement of fingerprint reading apparatuses and an increase in the cost thereof.

SUMMARY OF THE INVENTION

Accordingly, the invention aims at providing a fingerprint reading method and fingerprint reading apparatus which, with a simple structure, can check the authenticity of a finger tip pressed against a fingerprint collation surface.

A fingerprint reading method according to the invention comprises:

a first step of irradiating a detection beam having a first luminescent color (e.g., a detection beam from an LED 4 in FIG. 1) onto a fingerprint collation surface (e.g., a fingerprint collation surface 2 in FIG. 1) against which a finger tip is pressed to thereby acquire a first image corresponding to reflected light from the fingerprint collation surface;

a second step of irradiating a detection beam having a second luminescent color different from the first luminescent color onto the fingerprint collation surface against to thereby acquire a second image corresponding to reflected light from the fingerprint collation surface; and a third step of comparing the first image with the second image to determine authenticity of the finger tip pressed against the fingerprint collation surface.

An image state obtained, such as a differential contrast which is a difference between light intensities according to the undulations of a fingerprint, varies depending on a variation in the color of a detection beam in use. The differential contrast of a real and living finger significantly differs from the differential contrast of a false one which is not a living body as the color of the detection beam is changed, though such a difference may not be apparent in case where the detection beam has a specific color.

According to the invention, two detection beams of different colors are used and images corresponding to the two colors are compared with each other, thereby ensuring an improvement on the precision in determining whether a finger tip pressed against the fingerprint collation surface is a real fiber or a false one. The optical system, as a light source of the detection beams, that is essential for fingerprint collation has only to emit lights of two colors. The optical system is therefore simple in structure and can be realized at a low cost. Needless to say, detection beams of three colors or more can be used as well.

With the fingerprint reading method as the premise, the following schemes can be employed in addition.

The fingerprint reading method may be modified in such a way that the first image and the second image are monochromatic, and decision in the third step is carried out by comparing a difference between a differential contrast in the first image (e.g., a differential contrast D1 in FIG. 7) and a differential contrast in the second image (e.g., a differential contrast D2 in FIG. 7) with a predetermined threshold value (e.g., a threshold value R in FIG. 7).

In this case, as the image pickup unit (e.g., an image pickup unit 10 in FIG. 1) has only to acquire monochromatic images, the image pickup unit becomes significantly cheaper as compared with a case of acquiring color images and reduces the burden on the control system that performs image processing. This modification is also preferable in that decision of the authenticity of a finger tip can be carried out very simply.

Each of light sources of the first luminescent color and the second luminescent color may be an LED (e.g., LED's 4 and 5 in FIG. 1), and one of the first luminescent color and the second luminescent color may be red while the other is green.

In this case, LEDs which are popular as light sources for a fingerprint reading apparatus can be used. Moreover, the relationship between the luminescent colors permits the use of inexpensive LEDs and can ensure a large difference between images to be obtained with lights of the colors. Of course, lights of colors other than red and green can be used as well.

The fingerprint reading method may further comprise a fourth step of storing the first image and the second image (e.g., an SRAM 21 in FIG. 6), and the first image and the second image used in the third step may respectively be the first image and the second image stored in the fourth step.

This modification is preferable in that the time needed for a finger tip to be pressed against the fingerprint collation surface can be shortened as much as possible by quickly obtaining the fingerprint image of the finger tip pressed against the fingerprint collation surface for each color.

According to the invention, there is also provided a fingerprint reading apparatus that irradiates a detection beam from a light source onto a fingerprint collation surface (e.g., a fingerprint collation surface 2 in FIG. 1) against which a finger tip is pressed and inputs reflected light from the fingerprint collation surface to an image pickup unit (e.g., an image pickup unit 10 in FIG. 1) to thereby acquire an image corresponding to the reflected light, The fingerprint reading apparatus comprises:

a first light source (e.g., an LED 4 in FIG. 1) for emitting a detection beam having a first luminescent color; and a second light source (e.g., an LED 5 in FIG. 1) for emitting a detection beam having a second luminescent color different from the first luminescent color.

This apparatus provides the structure of an optical system from the light sources to the image pickup unit in case where the fingerprint reading method of the invention is executed.

The fingerprint reading apparatus may further comprise a light emission switching section for switching between a first light emission state in which light emission from the second light source is disabled and light emission from only the first light source is enabled and a second light emission state in which light emission from the first light source is disabled and light emission from only the second light source is enabled. In this case, the fingerprint reading apparatus is further provided with a light emission switching capability.

The fingerprint reading apparatus may further comprise a determination section (e.g., an authenticity discriminating circuit U3 in FIG. 6) for determining authenticity of a finger tip pressed against the fingerprint collation surface based on a difference between a first image acquired in the first light emission state and a second image acquired in the second light emission state. In this case, the fingerprint reading apparatus has such as structure as to be able to determine the authenticity of a finger tip.

The fingerprint reading apparatus according to claim 6, further comprising a diffuser (e.g., a diffuser 3 in FIG. 1), provided between the fingerprint collation surface and the first and second light sources, for irradiating the detection beams emitted from the first and second light sources in a surface emission form on the fingerprint collation surface. This can ensure irradiation of a finger tip pressed against the fingerprint collation surface with a uniform light beam as much as possible, which is preferable in making the differential contrast of the undulations of a finger tip uniform.

As mentioned in the foregoing description of the fingerprint reading method of the invention, each of the first light source and the second light source may be an LED, and one of the first luminescent color and the second luminescent color may be red while the other is green.

The fingerprint reading apparatus may further comprise memory sections (e.g., an SRAM 21 in FIG. 6) for respectively storing the first image and the second image, and the first image and the second image used by the determination section may respectively be the first image and the second image stored in the memory sections.

In this case, as mentioned in the foregoing description of the fingerprint reading method of the invention, the modification is preferable in that the time needed for a finger tip to be pressed against the fingerprint collation surface can be shortened as much as possible by quickly obtaining the fingerprint image of the finger tip pressed against the fingerprint collation surface for each color.

The image pickup unit may acquire monochromatic images, and decision in the determination section may be carried out by comparing a difference between a differential contrast in the first image (e.g., the differential contrast D1 in FIG. 7) and a differential contrast in the second image (e.g., the differential contrast D2 in FIG. 7) with a predetermined threshold value (e.g., the threshold value R in FIG. 7). In this case, as the image pickup unit should merely acquire monochromatic images, the image pickup unit becomes significantly cheaper as compared with a case of acquiring color images. This modification is also preferable in that decision of the authenticity of a finger tip can be carried out very simply.

DETAILED DESCRIPTION OF THE PREFERRED EMBODIMENT

A preferred embodiment of the invention will now be described with reference to the accompanying drawings.

Figure 1:
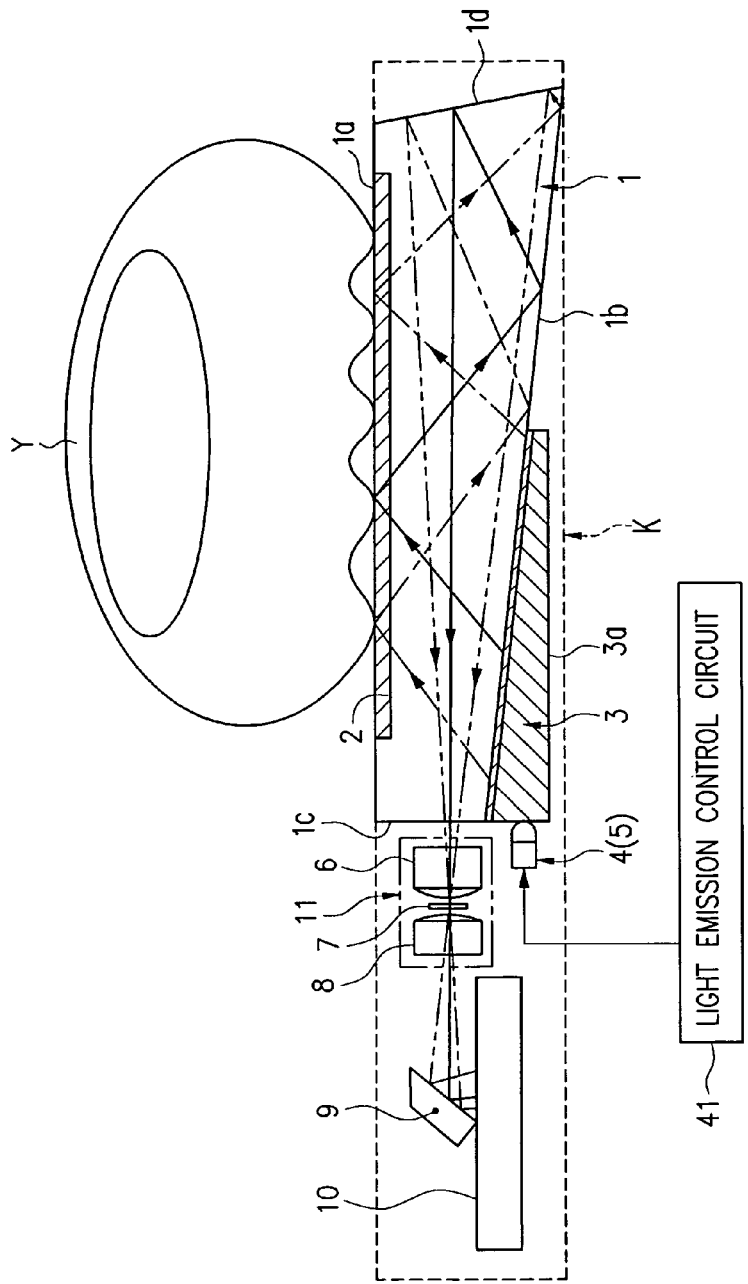
FIG. 1 is a schematic side view showing one example of an optical system to which the invention is adapted.

In FIG. 1, reference numeral "1" denotes a prism formed of optical glass or optical plastics and the hatching of the prism is not illustrated for the purpose of showing the paths of detection beams to be discussed later.

The prism 1 is a square prism with a square cross section and has the following four sides. A predetermined side 1a which is equivalent to the top side is flat and most of its area is designed as a fingerprint collation surface 2 against which a finger tip Y is pressed. According to the embodiment, the portion that becomes the fingerprint collation surface 2 is formed by coating a film member (e.g., a silicon film) for enhancing (the undulations of) the fingerprint of the finger tip on a predetermined area of the predetermined side 1a.

Of the four sides of the prism 1, an opposite side 1b facing the predetermined side 1a (fingerprint collation surface 2) is slightly inclined with respect to the predetermined side 1a. More specifically, the opposite side 1b is inclined in such a way that the top-to-bottom thickness of the prism 1 becomes gradually thicker rightward from the left-hand side in FIG. 1.

Of the four sides of the prism 1, one side surface 1c on the left-hand side in FIG. 1 extends perpendicular to the predetermined side 1a. Of the four sides of the prism 1, the other side surface 1d on the right-hand side in FIG. 1 is slightly inclined with respect to the predetermined side 1a. Specifically, the other side surface 1d is inclined in such a way that the distance from the one side surface 1c becomes gradually greater as it goes away from the predetermined side 1a.

A diffuser (light guiding plate) 3 is provided directly under the prism 1 or very close to the opposite side 1b. The diffuser 3 has a general shape of a flat plate. That side of the diffuser 3 which has a large area is located in a close vicinity of the opposite side 1b of the prism 1 (it may abut on the opposite side 1b) and parallel to the opposite side 1b. The diffuser 3 is designed to become gradually thinner leftward in FIG. 1 and has a bottom side 3a set parallel or almost parallel to the predetermined side 1a of the prism 1.

Figure 3:
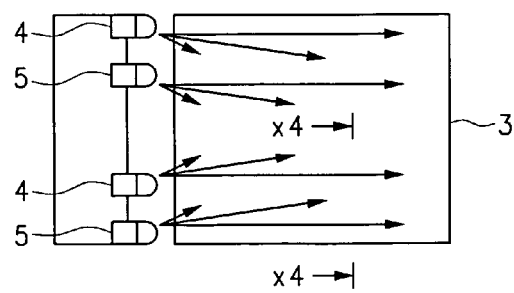
FIG. 3 is a schematic plan view showing a diffuser and light sources.

As shown in FIG. 3, LEDs 4 and 5 as light sources are arranged on the left end in FIG. 1. A plurality of LEDs 4 (two in the embodiment) are used to emit, for example, red light and are provided at some intervals in the vertical direction in the sheet of the diagram. A plurality of LEDs 5 (two in the embodiment) are used to emit, for example, green light and are provided at some intervals in the vertical direction in the sheet of the diagram. One LED 4 and one LED 5 which are located close to each other make a pair, thus providing a total of two pairs in the embodiment.

Figure 4:
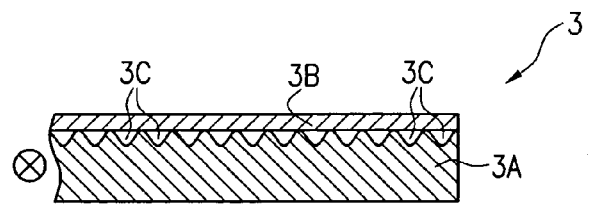
FIG. 4 is a cross-sectional view of the diffuser taken along line X4—X4 in FIG. 3.

The diffuser 3 diffuses detection beams emitted from the LEDs 4 and 5 and emit the detection beams toward the opposite side 1b of the prism 1 in surface emission. The diffuser 3 may take a structure as shown in FIG. 4. Specifically, the diffuser 3 comprises a body plate portion 3A and a top plate portion 3B integrated to the top surface of the body plate portion 3A. Each of the body plate portion 3A and the top plate portion 3B is formed by a light transmitting member. Groove portions 3C are formed on nearly the entire top surface of the body plate portion 3A. The groove portion 3C disperses the detection beams from the LEDs 4 and 5 in a wide planar shape, and extends in a direction (the left-to-right direction in FIGS. 1 and 3) nearly parallel to the direction in which lights emitted from the LEDs 4 and 5. The multiple groove portions 3C are formed in the layout direction of the LEDs 4 and 5 (the perpendicular direction to the sheet of FIG. 1 and the vertical direction in FIGS. 3). The detection beam that is diffused widely by the body plate portion 3A is corrected by the top plate portion 3B to become a uniform light beam that travels in a predetermined direction.

Figure 5:
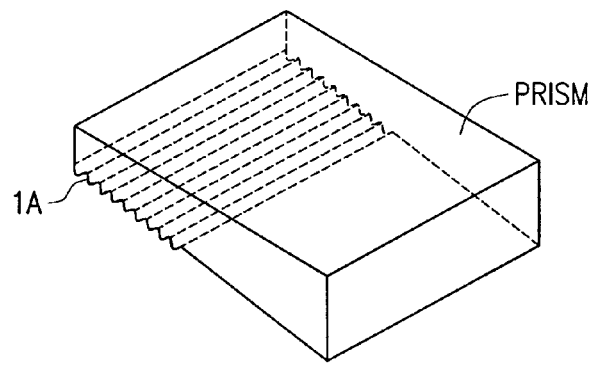
FIG. 5 is a perspective view showing the structure of a prism.

As shown in FIG. 5, multiple microprisms 1A extending in a direction perpendicular to the groove portions 3C (FIG. 4) of the diffuser 3 are provided on the side 1b of the prism 1 that contacts the diffuser 3, in a direction where the lights from the LEDs 4 and 5 travel (the left-to-right direction in FIG. 1). The provision of the microprisms 1A this way can ensure effective diffusion of light toward the fingerprint collation surface 2.

The detection beam that is set in a surface emission state by the diffuser 3 is transmitted within the prism 1 as indicated by arrows in FIG. 1 and finally goes outside from the one side surface 1c of the prism 1 by the setting of the four sides 1a to 1d of the prism 1. Specifically, the detection beam from the diffuser 3 enters the prism 1 from the opposite side 1b, travels within the prism 1 and obliquely enters the predetermined side 1a or the fingerprint collation surface 2. The detection beam that is reflected at the fingerprint collation surface 2 travels within the prism 1 and enters the opposite side 1b askew. The reflected light that has entered the opposite side 1b is reflected at the opposite side 1b, travels within the prism 1 and enters the other side surface 1d askew. The reflected light that has entered the other side surface 1d is reflected at the other side surface 1d, travels within the prism 1 toward the one side surface 1c and goes out of the prism 1 from the one side surface 1c.

An image forming lens body RZ is located to the left of the prism 1 in FIG. 1, i.e., in the outgoing direction of the detection beam from the prism 1. The image forming lens body RZ is a combination of a first lens 6, an iris (diaphragm) 7 and a second lens 8. The second lens 8 is located opposite to the first lens 6 with the iris 7 in between. The second lens 8 is a single convex lens which has a convex surface (light incident surface) to which the detection beam having passed the iris 7 enters and a flat light emerging surface.

A reflecting mirror 9 is arranged to the left of the image forming lens body RZ and an image pickup unit 10 is arranged below the reflecting mirror 9. The image pickup unit 10 can be constituted by multiple photodiodes arranged in, for example, an n×m matrix, or can be constituted by a CMOS image sensor. The image pickup unit 10 is designed as a monochromatic type which can acquire only monochromatic images and is inexpensive. The reflecting mirror 9 and the image pickup unit 10 are arranged close to each other in the vertical direction to make the vertical size of the apparatus generally thin.

A broken line in FIG. 1 denotes a casing K which covers those members which constitute the optical system. The casing K is formed very thin to have a thickness slightly greater than the thickness of the prism 1.

The thin diffuser 3 is arranged below and in the close vicinity of the prism 1 to make the top-to-bottom thickness of the assembly of the prism 1 and the diffuser 3 smaller, thereby contributing to making the top-to-bottom thickness of the casing K smaller. Particularly, because the direction of a change in the top-to-bottom thickness of the prism 1 is opposite to the direction of a change in the top-to-bottom thickness of the diffuser 3 in the left and right direction in FIG. 1, i.e., because the prism 1 becomes gradually thicker rightward in FIG. 1 whereas the diffuser 3 becomes gradually thinner rightward, the top-to-bottom thickness of the assembly of the prism 1 and the diffuser 3 when placed one on the other in the vertical direction becomes smaller. In case where the diffuser 3 is so designed, like the prism 1, as to become gradually thicker rightward in FIG. 1, the top-to-bottom thickness of the assembly of the prism 1 and the diffuser 3 becomes considerably thicker than that in FIG. 1.

The assembly of the prism 1 and the diffuser 3 is disposed in a locus extending leftward in FIG. 1 with the image forming lens body RZ and the LEDs 4 and 5 placed apart vertically. The reflecting mirror 9 and the image pickup unit 10 with a thin plate shape, which are arranged to the left in FIG. 1 with respect to the image forming lens body R2 and the LEDs 4 and 5, are disposed apart vertically from each other in the extending locus. The various components RZ (6–8), 9 and 10 are arranged within the range of the top-to-bottom thickness of the assembly of the prism 1 and the diffuser 3, so that the casing K can be made as thin as possible. The first lens 6, the iris 7 and the second lens 8 are held and integrated in a holding case 11 beforehand to become an integrated assembly, and the holding case 11 is secured to the casing K at a predetermined position. With the optical axis of the image forming lens body RZ taken as a reference, the fingerprint collation surface 2 is located on one side to the optical axis, the diffuser 3 and the LEDs 4 and 5 are located on the other side to the optical axis, and the prism 1 is located on the optical axis (the optical axis is positioned at nearly the intermediate position of the prism 1 in the vertical direction).

One of the LEDs 4 and 5 is enabled to emit light first, then the other LED is enabled to emit light. Wile one LED is emitting light, the other one is disabled. That is, the LED 4 which emits, for example, red light is first enabled to emit light for a predetermined time (during which the LED 5 which emits green light is disabled), then the LED 5 is enabled to emit light for a predetermined time (during which the LED 4 is disabled). A light emission control circuit which switches the light emission states of the LEDs 4 and 5 this way is indicated by a symbol "U1" in FIG. 1.

Figure 6:
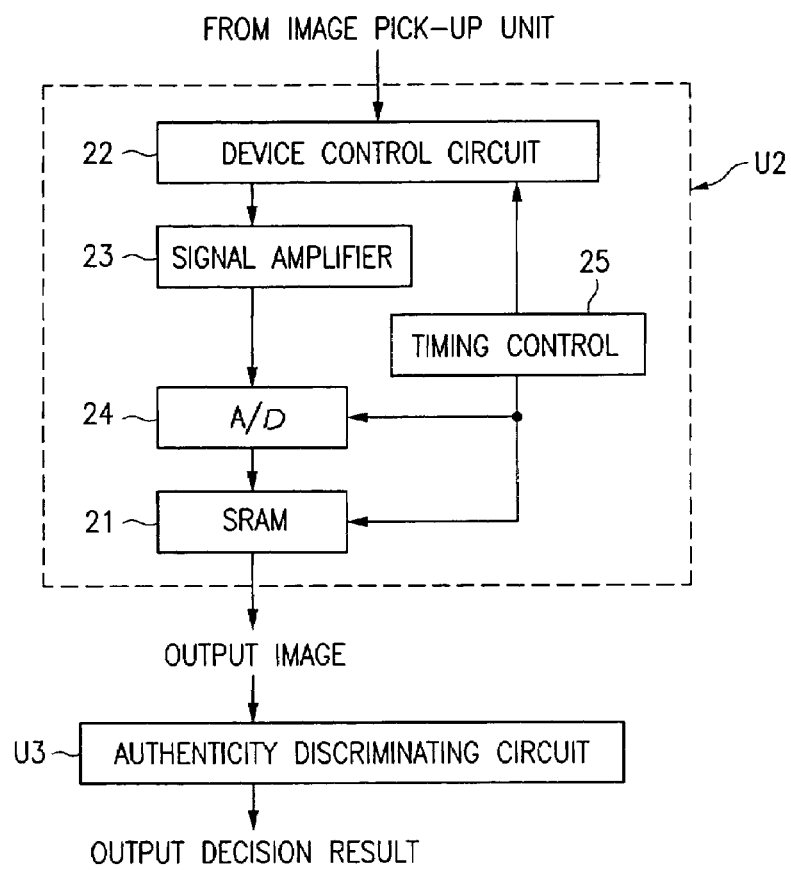
FIG. 6 is a diagram exemplifying a circuit which stores images and determines the authenticity of a finger tip.

FIG. 6 shows a circuit which processes images picked up by the image pickup unit 10. In FIG. 6, a control circuit U2 stores the images picked up by the image pickup unit 10 in an SRAM 21 as memory means. Specifically, an image (image signal) from the image pickup unit 10 is input (stored) into the SRAM 21 via an image-pickup device control circuit 22, a signal amplifier 23 and an A/D converter 24. A timing control circuit 25 synchronizes the timings of the control circuit 22, the A/D converter 24 and the SRAM 21.

An authenticity discriminating circuit U3 constitutes a determination section for determining if the finger tip Y is an authentic finger tip. The authenticity discriminating circuit U3 whose function will be discussed later is designed in such a way that images stored in the SRAM 21 (a first image obtained when only the LED 4 is enabled to emit light and a second image obtained when only the LED 5 is enabled to emit light) are fetched in the circuit U3 in order to determine the authenticity of the finger tip Y. The authenticity discriminating circuit U3 outputs the results of the decision on the authenticity of the finger tip Y. Of course, on the premise that the finger tip Y has been determined is authentic, a decision on whether a person whose finger tip is to be checked is authentic or not is separately carried out by comparing the currently fetched image (at least one of the first image and the second image) with the fingerprint image of the real authentic person stored (registered) in advance.

Figure 2:
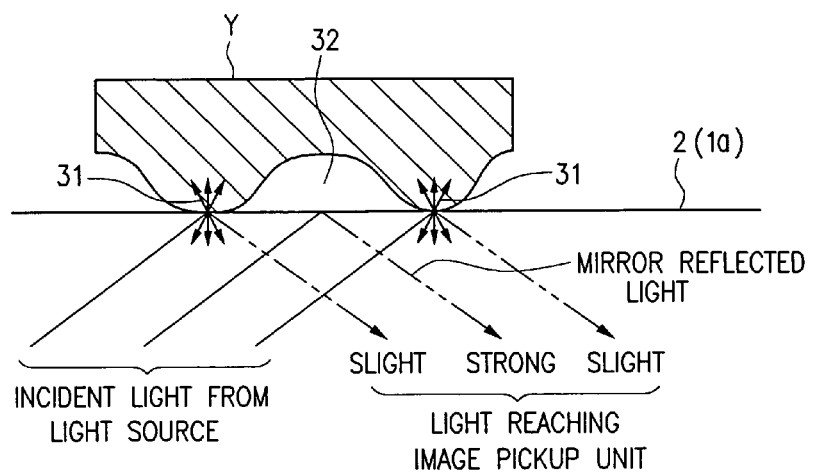
FIG. 2 is a diagram showing in enlargement a finger tip pressed against a fingerprint collation surface.

Referring to FIG. 2, a description will be given of the intensities of reflected light according to the undulations of the fingerprint of the finger tip Y and how to determine the authenticity of the finger tip by using two detection beams of different colors.

FIG. 2 shows part of the finger tip Y in enlargement, and indicates a portion equivalent to the protruding portion of the fingerprint by numeral "31" and a portion equivalent to the recess portion of the fingerprint by numeral "32". The detection beam that is incident to the protruding portion 31 is diffused in various directions at the protruding portion 31, so that the intensity of reflected light reflected at the protruding portion 31 becomes low.

The detection beam that is incident to the recess portion 32, on the other hand, is mirror-reflected without diffusion. As a result, reflected light reflected at the recess portion 32 has a high intensity. Therefore, the image obtained by the image pickup unit 10 has a low light intensity at the portion equivalent to the protruding portion 31 and has a high light intensity at the portion equivalent to the recess portion 32, thereby providing a large difference between contrasts corresponding to the undulations of the fingerprint as a whole. This is desirable in executing fingerprint collation at a high precision (clear recognition of the shapes of the undulations of the fingerprint is possible).

The difference between the light intensities at the protruding portion 31 and the recess portion 32 is expressed in a numeral as a differential contrast. Let HRC be the differential contrast of an image obtained by pressing the real finger tip Y against the fingerprint collation surface 2 by using only a red detection beam. Then, HRC is expressed in a numeral as "2". Likewise, let NRC be the differential contrast of an image obtained by pressing a false finger which has a monochromatic copy of the finger tip that has yielded HRC=2 against the fingerprint collation surface 2 by using only a red detection beam. Then, NRC=6.

Likewise, let HGC be the differential contrast of an image obtained by pressing the real finger tip Y against the fingerprint collation surface 2 by using only a green detection beam. Then, HGC is expressed in a numeral as "5", for example. Likewise, let NGC be the differential contrast of an image obtained by pressing a false finger which has a monochromatic copy of the finger tip that has yielded HGC=5 against the fingerprint collation surface 2 by using only a green detection beam. Then, NGC=5.

The following is the reason why the differential contrast differs by using detection beams of different colors. First, the intensity of the light diffusion at the protruding portion 31 of the fingerprint has a correlation with the color of the detection beam and the color of the protruding portion 31 that is an object to be detected. The intensity of light diffusion appears as a difference between the contrasts of the acquired image at the protruding portion and the recess portion. Even in a case of a false finger whose fingerprint has the same undulations, changing the color of the detection beam causes a differential contrast different from the differential contrast obtained in case of the real finger. In other words, in case of a real, living finger tip, changing the color of the detection beam makes the difference between the differential contrast with one color and the differential contrast with another significantly large (this difference becomes smaller in case of a false finger).

The method of determining the authenticity of a finger tip will be described more specifically. When the differential contrast obtained for a real finger tip using only a green detection beam is compared with the differential contrast obtained for a false finger, the differential contrast of the real finger tip, HGC=5ÿ becomes the same as the differential contrast of the false finger, NGC=5, so that it is not possible to determine if the finger tip is a real one or a false one. However, the differential contrast obtained for a real finger tip using only a red detection beam is HRC=2 and the differential contrast obtained for a false finger using only a red detection beam is NRC=6, so that there is a large difference between the differential contrasts.

In case where the finger tip is a real one, the absolute value of the difference between the differential contrast (HRC=2) when the detection beam has a red color and the difference between the differential contrast (HGC=5) when the detection beam has a green color becomes "3" which is a relatively large value.

In case where the finger tip is a false one, the absolute value of the difference between the differential contrast (NRC=6) when the detection beam has a red color and the difference between the differential contrast (NRC=5) when the detection beam has a green color becomes "1" which is a considerably small value.

At the time fingerprint collation is carried out, it is unclear if the finger tip Y is a real one or a false one. Therefore, a differential contrast D1 of an image obtained when the detection beam has a red color is acquired, a differential contrast D2 of an image obtained when the detection beam has a green color is acquired, and the difference, dD, between both differential contrasts D1 and D2 is acquired. (dD can he indicated by, for example, an absolute value.) It is possible to determine that the finger tip is a real one when the difference dD is greater than a predetermined threshold value R whereas it is possible to determine that the finger tip is a false one when the difference dD is smaller than the predetermined threshold value R.

Figure 7:
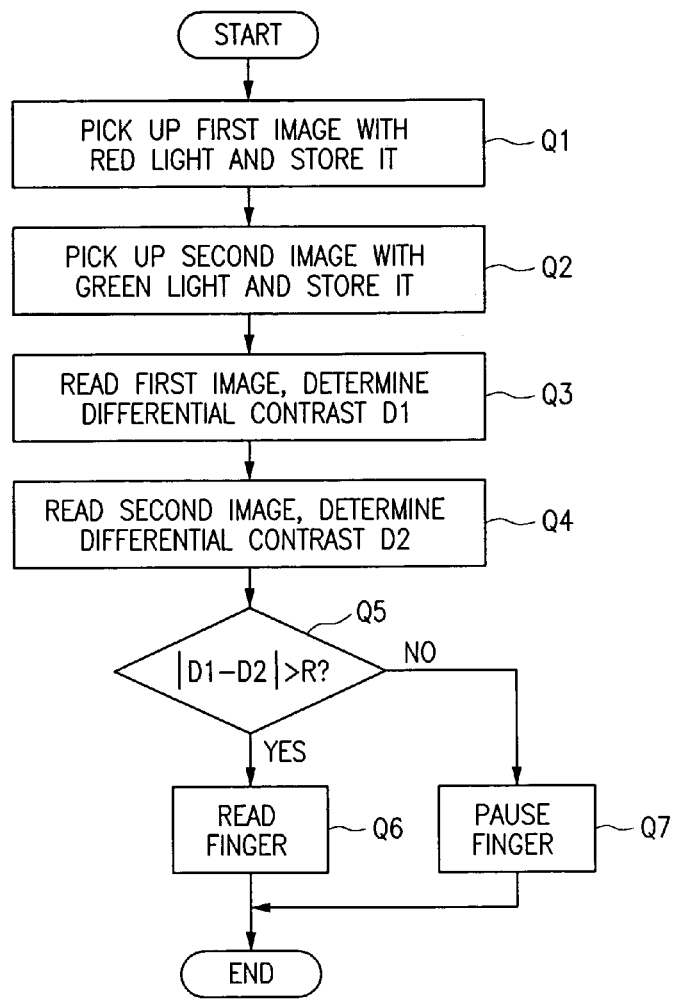
FIG. 7 is a flowchart illustrating an example of control to store images and determine the authenticity of a finger tip based on the images.

The authenticity discriminating circuit U3 in FIG. 6 executes the authenticity of a finger tip. Referring now to the flowchart of FIG. 7, a description will be given of the contents of the control of the authenticity discriminating circuit U3 (the light emission state switching control by the light emission control circuit U1 and the process of storing images in the SRAM 21 using the circuit U2) including the process of storing images into the SRAM 21. In the following description, "Q" indicates a step.

First, in Q1, the LED 4 which emits red light is enabled to emit light (while the LED 5 which emits green light is disabled), and an image acquired by the image pickup unit 10 at this time is stored as the first image in the SRAM 21. Next, in Q2, the LED 5 which emits green light is enabled to emit light (while the LED 4 which emits red light is disabled), and an image acquired by the image pickup unit 10 at this time is stored as the second image in the SRAM 21.

In Q3, the first image stored in the SRAM 21 is fetched to the authenticity discriminating circuit U3 and the differential contrast D1 that is produced according to the undulations of the fingerprint in the first image is determined. Likewise, in Q4, the second image stored in the SRAM 21 is fetched to the authenticity discriminating circuit U3 and the differential contrast D2 that is produced according to the undulations of the fingerprint in the second image is determined.

In Q5, it is determined if the absolute value of the difference (dD) between the differential contrasts D1 and D2 is greater than the predetermined threshold value R. When the decision in Q5 is YES, it is determined in Q6 that the finger tip is a real one. When the decision in Q5 is NO, it is determined in Q7 that the finger tip is a false one.

According to the invention, it is possible to determine the authenticity of a finger tip pressed against the fingerprint collation surface with a very simple structure, particularly, while making the structure of the optical system simpler.

What is claimed is:

1. A fingerprint reading apparatus comprising:
   a first light source for emitting a detection beam having a first luminescent monochromatic color onto a fingerprint collation surface for receiving a finger tip;
   a second light source for emitting a detection beam having a second luminescent monochromatic color different from said first luminescent monochromatic color onto said fingerprint collation surface;
   an image pick up unit for acquiring images from said fingerprint collation surface; and
   a determination section for determining authenticity of a finger tip pressed against said fingerprint collation surface based on a difference between a first monochromatic image acquired from illumination of said fingerprint collation surface by said first luminescent monochromatic color and a second monochromatic image acquired from illumination of said fingerprint collation surface by said second luminescent monochromatic color, said determining authenticity in said determination section is carried out by comparing a predetermined threshold value with a difference between a differential contrast in said first monochromatic image and a differential contrast in said second monochromatic image.

2. The fingerprint reading apparatus according to claim 1, further comprising a light emission switching section for switching between a first light emission state in which light emission from said second light source is disabled and light emission from only said first light source is enabled and a second light emission state in which light emission from said first light source is disabled and light emission from only said second light source is enabled.

3. The fingerprint reading apparatus according to claim 1, further comprising a diffuser, provided between said fingerprint collation surface and said first and second light sources, for irradiating said detection beams emitted from said first and second light sources in a surface emission form on said fingerprint collation surface.

4. The fingerprint reading apparatus according to claim 1, wherein each of said first light source and said second light source is an LED, and
   one of said first luminescent monochromatic color and said second luminescent monochromatic color is red and the other is green.

5. The fingerprint reading apparatus according to claim 1, further comprising memory sections for respectively storing said first monochromatic image and said second monochromatic image, and
   wherein said first monochromatic image and said second monochromatic image used by said determination section are respectively said first monochromatic image and said second monochromatic image stored in said memory sections.

6. A fingerprint reading method comprising:
   a step of irradiating a detection beam having a first luminescent monochromatic color onto a fingerprint collation surface against which a finger tip is pressed to thereby acquire a first monochromatic image and a first differential contrast value;
   a step of irradiating a detection beam having a second luminescent monochromatic color different from said first luminescent monochromatic color onto said fingerprint collation surface against which a finger tip is pressed to thereby acquire a second monochromatic image and a second differential contrast value; and
   a step of comparing the said first differential contrast value with said second differential contrast value to determine authenticity of said finger tip pressed against said fingerprint collation surface.

7. The fingerprint reading method according to claim 6, wherein said comparing is carried out by comparing a difference between said first differential contrast value and said second differential contrast value with a predetermined threshold value.

8. The fingerprint reading method according to claim 6, wherein each irradiating source of said first luminescent monochromatic color and said second luminescent monochromatic color is an LED, and one of said first luminescent monochromatic color and said second luminescent monochromatic color is red and the other is green.

9. The fingerprint reading method according to claim 6, further comprising a step of comparing at least one of said first or second monochromatic image to a registered image to determine an identity of a person.

10. The fingerprint reading method according to claim 9, wherein said registered image is stored in advance.

11. A fingerprint reading method comprising:
    a step of irradiating a detection beam from a first light source having a first luminescent primary color onto a fingerprint collation surface against which a finger tip is pressed to thereby acquire a first primary color image corresponding to reflected light from said fingerprint collation surface;

a step of irradiating a detection beam from a second light source having a second luminescent primary color different from said first luminescent primary color onto said fingerprint collation surface against which a finger tip is pressed to thereby acquire a second primary color image corresponding to reflected light from said fingerprint collation surface; and a step of comparing said first primary color image with said second primary color image to determine authenticity of said finger tip pressed against said fingerprint collation surface, said comparing is carried out by comparing a predetermined threshold value with a difference between a differential contrast in said first primary color image and a differential contrast in said second primary color image.

12. The fingerprint reading method according to claim 11, wherein said first luminescent primary color and said second luminescent primary color are each produced by an LED, and one of said first luminescent primary color and said second luminescent primary color is red and the other is green.

* * * * *